US007622033B1

(12) United States Patent
McGehee

(10) Patent No.: US 7,622,033 B1
(45) Date of Patent: Nov. 24, 2009

(54) RESIDUAL OIL COKING SCHEME

(75) Inventor: James F. McGehee, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 441 days.

(21) Appl. No.: 11/456,907

(22) Filed: Jul. 12, 2006

(51) Int. Cl.
C10G 9/36 (2006.01)
C10B 55/00 (2006.01)
(52) U.S. Cl. .......................... 208/50; 208/125; 208/128
(58) Field of Classification Search ............... 208/7, 208/50, 106, 81, 86, 129, 131
See application file for complete search history.

(56) References Cited

U.S. PATENT DOCUMENTS

| | | | |
|---|---|---|---|
| 3,057,704 A | 10/1962 | Franz et al. | 44/70 |
| 3,247,129 A | 4/1966 | Roelofsen et al. | 252/417 |
| 3,401,124 A | 9/1968 | Goulden | 252/417 |
| 3,532,620 A | 10/1970 | Asmus et al. | 208/113 |
| 3,591,485 A | 7/1971 | Mason, Jr. | 208/78 |
| 3,689,402 A | 9/1972 | Youngblood et al. | 208/93 |
| 3,702,308 A | 11/1972 | Bauer et al. | 252/417 |
| 3,767,564 A | 10/1973 | Youngblood et al. | 208/92 |
| 3,900,391 A | 8/1975 | Merrill, Jr. et al. | 208/370 |
| 4,332,670 A | 6/1982 | Antal | 208/68 |
| 4,509,326 A | 4/1985 | Jorgensen | 60/39.182 |
| 4,510,043 A | 4/1985 | Oleck et al. | 208/97 |
| 4,789,459 A | 12/1988 | Lumbroso et al. | 208/155 |
| 4,904,372 A | 2/1990 | Goelzer | 208/113 |
| 4,944,862 A | 7/1990 | Chen et al. | 208/49 |
| 5,098,554 A | 3/1992 | Krishna et al. | 208/113 |
| 5,114,682 A | 5/1992 | Goelzer | 422/142 |
| 5,246,568 A | 9/1993 | Forbus et al. | 208/59 |
| 6,379,534 B1 | 4/2002 | Fung et al. | 208/93 |
| 2003/0159973 A1* | 8/2003 | Maa et al. | 208/126 |
| 2005/0261383 A1* | 11/2005 | Xie et al. | 518/716 |

(Continued)

FOREIGN PATENT DOCUMENTS

CA 2230318 A1 3/1997

(Continued)

OTHER PUBLICATIONS

"UOP Fluid Catalytic Cracking Process" by C.L. Hemler et al., Handbook of Petroleum Refining Processes, Robert A. Meyers, Third Edition, McGraw-Hill, 2003, Chapter 3.3, pp. 3.47-3.69.

(Continued)

*Primary Examiner*—Walter D Griffin
*Assistant Examiner*—Renee Robinson
(74) *Attorney, Agent, or Firm*—James C. Paschall

(57) ABSTRACT

A coking process and apparatus may include cracking a hydrocarbon feed stream with a catalyst, generating a hot flue gas from regenerating said catalyst, directing the hot flue gas into a spray contactor, spraying a heavy residual oil into the spray contactor, and coking the heavy residual oil utilizing the hot flue gas as a heat source. The hydrocarbon feed stream and the heavy residual oil may each or both be generated by a solvent deasphalter. The coking process produces a solid coke product and volatile hydrocarbons which leave with the hot gas and may be burned in an oxidizer to generate steam with the pressure energy recovered by a turbo-expander.

12 Claims, 1 Drawing Sheet

U.S. PATENT DOCUMENTS

2005/0276735 A1    12/2005    Jorgensen  ................ 422/224

FOREIGN PATENT DOCUMENTS

EP           1 243 316 A2      9/2002
WO           WO 01/83643 A2   11/2001

OTHER PUBLICATIONS

"Residue Upgrading with the Shell Gasification Process for LOTOS Refinery" by K. Sep, presented at the Gasification Technologies 2004, Washington, Oct. 2-5, 2004.

"The Chemistry of Alberta Oil Sands, Bitumens and Heavy Oils" by O.P. Strausz et al., Calgary: Alberta Energy Research Institute 2003, pp. 110-114.

"ConocoPhillips Delayed Coking Process" by G.C. Hughes et al., Handbook of Petroleum Refining Processes, Robert A. Meyers, Third Edition, McGraw-Hill, 2003, Chapter 12.1, pp. 12.3-12.31.

"Tutorial: Delayed Coking Fundamentals" by P.J. Ellis et al., presented at the AIChE 2000 Spring National Meeting in Atlanta, GA, Mar. 5-9, 2000.

"The ROSE Process" by T. Abdel-Halim et al., Handbook of Petroleum Refining Processes, Robert A. Meyers, Third Edition, McGraw-Hill, 2003, Chapter 10.2, pp. 10.15-10.28.

Product literature "GE Power Systems Gas Turbine and Combined Cycle Products".

Upson, et al.; Promoted Combusion Improses FCCU Flexibility; Oil & Gas Journal; Nov. 23, 1987; pp. 65-70.

De Haro et al.; O2 Enrichment Increases FCC Operating Flexibility; Oil & Gas Journal; May 11, 1992; pp. 40-45.

Sadeghbeigi, R.; Fluid Catalytic Cracking Handbook; 1995; Gulf Publishing Company; Houston, Texas; ISBN 0-88415-290-1; TP690. 4.S23; chapters 1, 5 & 6.

* cited by examiner

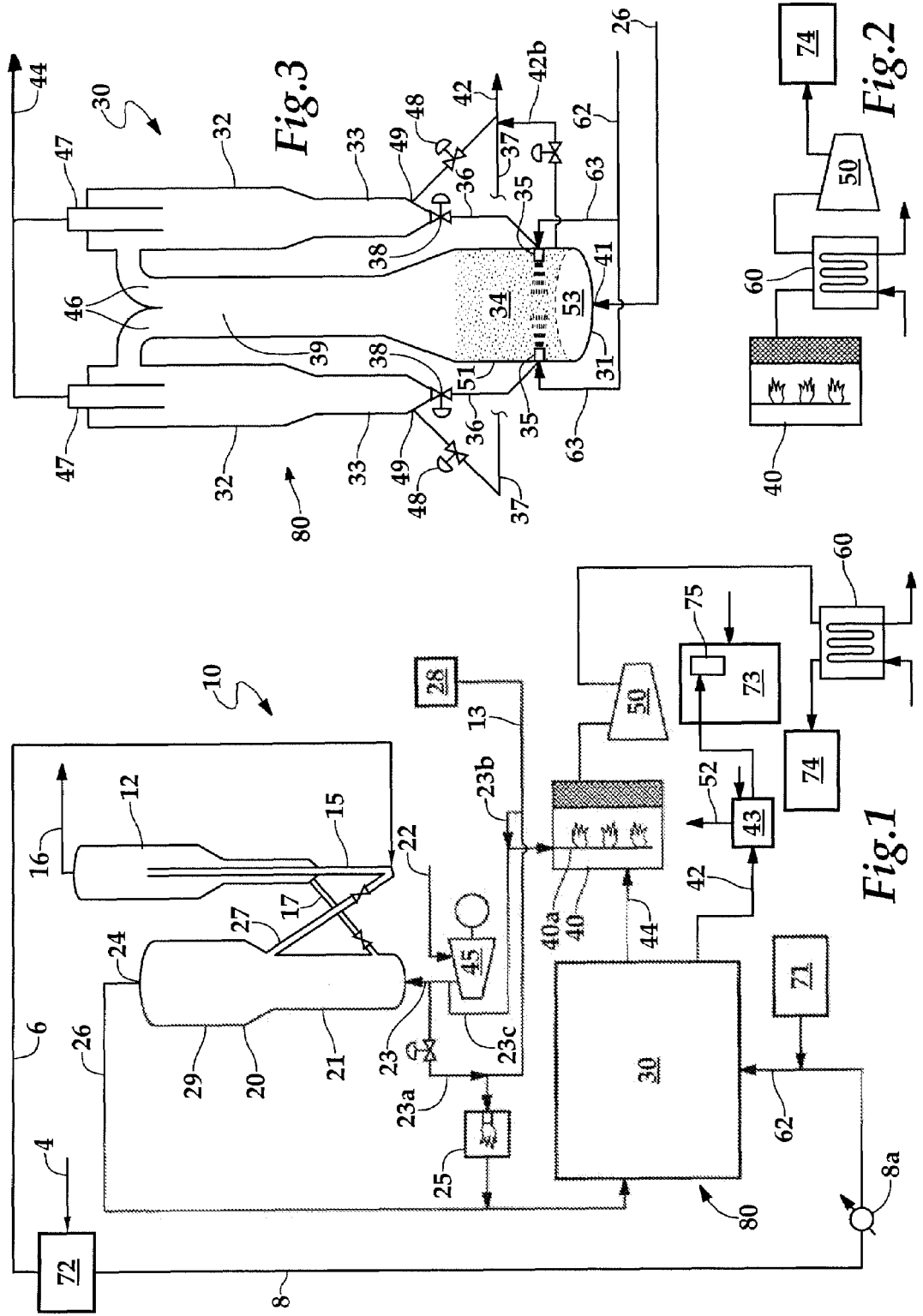

RESIDUAL OIL COKING SCHEME

BACKGROUND OF THE INVENTION

This invention is directed to a process to thermally convert a heavy residual oil of low value to a solid fuel and a vapor stream which may be further combusted as a fuel for production of energy or process steam. More specifically, the invention relates to a heavy residual oil with high density, high sulfur content and high viscosity, such as which cannot be shipped or pipelined as-such. The means of thermal conversion uses a fluidized bed system whose fluidizing gas is produced by the fluid catalytic cracking (FCC) process.

DESCRIPTION OF THE PRIOR ART

Fluid catalytic cracking (FCC) is a catalytic conversion process of heavy hydrocarbons into lighter hydrocarbons accomplished by contacting the heavy hydrocarbons in a fluidized reaction zone with a microspherical catalyst. Low value residual oils are converted to solid coke and vaporized liquid products by either delayed coking or fluidized coking, which is well known in the refining industry. An example of a fluidized coking process is taught in WO 01/83643 A2.

The FCC process is ubiquitous in petroleum refining as the primary means of direct production of gasoline. The details of the FCC process are described in C. L. Hemler and L. F. Smith, "UOP Fluid Catalytic Cracking Process" in R. A. Meyers ed., HANDBOOK OF PETROLEUM REFINING PROCESSES, Third Edition, McGraw-Hill 2003, pages 3.47-3.69.

The basic components of the FCC process include a riser, a reactor vessel for disengaging spent catalyst from product vapors, and a regenerator. In the riser, the hydrocarbon feed contacts the catalyst and is cracked into a product stream containing lighter hydrocarbons. In the riser, regenerated catalyst and the hydrocarbon feed are transported upward by the expansion of the gases that result from the vaporization of the hydrocarbons, and other fluidizing mediums, upon contact with the hot catalyst. Upon contact with the catalyst the hydrocarbon feed is cracked into lower molecular weight products. Coke accumulates on the catalyst particles as a result of the cracking reaction and the catalyst is then referred to as "spent catalyst." The spent catalyst must be removed from the cracked products to reduce catalyst losses from the system and to avoid contamination of the products. High temperature regeneration burns coke from the spent catalyst. The regenerated catalyst is then returned to the reaction zone. Spent catalyst is continually removed from the reaction zone and replaced by essentially coke-free catalyst from the regeneration zone.

The regeneration flue gas leaving the regenerator carries some entrained catalyst particles. Recovering pressure energy from the regeneration flue gas requires several stages of separators to remove the entrained catalyst to prevent erosion on the turboexpander blades. These cleanup separators rob power in the form of pressure energy from the flue gas and are also expensive and require large plot areas. Moreover, the recovery of pressure or thermal energy at close to the regeneration temperature is usually less than optimal by either power recovery or steam generation systems. Moreover, the extraction of power from the FCC flue gas is done according to the Brayton cycle using adiabatic expansion, the efficiency of which is always improved by higher inlet pressure and temperature. Recovery of heat by direct generation of steam in a flue gas heat recovery steam generator is also more economical if temperature is boosted relative to the exhaust gas condition of the FCC regenerator, because the heat transfer is convective requiring relatively large heat exchange surfaces.

Solvent deasphalting processes produce a purified, demetallized oil which is often used as a chargestock for FCC or other conversion units and a rejected bottoms product, pitch. However, the by-product pitch stream is typically less than 10 API gravity and high viscosity, and is therefore too heavy to ship via pipeline unless an expensive heating system is in place. The pitch can be pelletized, for example in a system as described in EP 1243316A2, but this involves extra equipment and handling. Otherwise, the pitch has to be burned on site typically in a fluid bed boiler in which limestone adsorbs the oxides of sulfur for pollution control. Pitch can also be coked to remove some processable hydrocarbon or fuel gas, creating a solid fuel for sales. However, this involves relatively large and expensive units for the sake of a modest amount of conversion yield. Pitch can also be gasified in a partial oxidation process as described in Sep, "Residue Upgrading with the Shell Gasification Process for LOTOS Refinery" presented October 2004 at Gasification Technologies 2004. This process involves significant capital expense.

In the coking process, a purely thermal destruction of a hydrocarbon yields a solid residue and volatile cracked products. O, Strausz and E. Lown, "The Chemistry of Alberta Oil Sands" Calgary: Alberta Energy Research Institute 2003, p. 110. Distillation of petroleum and petroleum products "leave some non-distillable residue behind which, on further heating, decompose to release some additional distillable material and a carbon residue. The original distillable fraction of the oil, depending on the temperature and other characteristics of the distillation, may also partially decompose and ultimately add to the carbon residue." Id.

In delayed coking, the feed is heated and charged to a drum where the residual oil dwells typically for about 12 hours and solidifies while the liquid products are recovered and fed to a fractionation column. Hughes, et. al. "ConocoPhillips Delayed Coking Process." Chapter 12.1 in Robert A. Meyers, ed. HANDBOOK OF PETROLEUM REFINING PROCESSES, Third Edition, McGraw-Hill 2003. The coke is then cooled with water and broken apart in the drum (typically with high pressure water) and dumped in chunk form. This is the most popular and widespread type of coking. Id.

In fluidized coking, the feed is sprayed into a circulating fluidized stream of coke particles and the operation is continuous with a slipstream of the sand-like particles withdrawn continuously from a tap in the coking chamber. The heat necessary to accomplish the thermal decomposition to coke is partly supplied by burning some of the coke in a combustor, from which the hot particles are returned to the contacting zone. Ellis, P. and Paul, C. "Tutorial: Delayed Coking Fundamentals." $3^{rd}$ International Conference on Refining Processes, American Institute of Chemical Engineers Spring Meeting, 5-9 Mar., 2000, p. 6. This operation has some advantages, in that it is a continuous rather than a batch process as is the case with delayed coking. Also, the yield of solid product is minimized and in a more convenient form and there is not so much consumption of cooling water and generation of waste water to be treated.

However, one major disadvantage of fluidized cokers is the need to operate a fluidized combustor section to supply the heat. There is a need for an efficient and economical process to convert heavy pitch to a granular solid fuel and monetize the small amount of value remaining in those hydrocarbons which can be thermally cracked.

SUMMARY OF THE INVENTION

In accordance with one aspect of the invention, a coking process may include cracking a hydrocarbon feedstream with a catalyst, generating a hot flue gas from regenerating the catalyst, directing the hot flue gas into a spray contactor, spraying a heavy residual oil into the spray contactor, and coking the heavy residual oil utilizing the hot flue gas as a heat source. An apparatus for coking in another aspect of the invention may comprise a catalyst regenerator having a flue gas outlet, a feed line for carrying heavy residual oil feed from a source; and a spray contactor flowably connected to said flue gas outlet and to said feed line. The catalyst regenerator may be part of an FCC unit.

BRIEF DESCRIPTION OF THE DRAWINGS

FIG. 1 is a schematic of a coking scheme and a power recovery scheme including an oxidizer connected to an expander which is connected to a steam generator.

FIG. 2 is a schematic of the power recovery scheme including an oxidizer connected to a steam generator which is connected to an expander.

FIG. 3 is a cross-sectional elevation view of the spray contactor of FIG. 1.

DETAILED DESCRIPTION OF THE INVENTION

A coking scheme 10 may include generating a hot flue gas from cracking a hydrocarbon feedstream, regenerating spent catalyst, directing the hot flue gas into a spray contactor 30, spraying heavy residual oil into the spray contactor 30, and coking the heavy residual oil utilizing the hot flue gas as a heat source.

As shown in FIG. 1, a coking scheme 10 may incorporate the byproducts of an FCC reaction process taking place in a riser 15 for cracking a hydrocarbon feed stream over FCC catalyst. Spent catalyst and product vapors are separated in a reactor vessel 12 and a regenerator 20 regenerates spent catalyst by combustion with oxygen. The hot flue gases from regeneration may include oxygen, carbon dioxide, water and sulfur oxides. The flue gas may come from a partial regeneration combustion operation, forming carbon dioxide and carbon monoxide, wherein the ratio of said carbon dioxide to carbon monoxide is between about 1 and about 5.

A crude oil stream in feed line 4 may be deasphalted such as in a solvent deasphalter 72 to generate a heavy residual oil in feed line 8 and a hydrocarbon feed stream in feed line 6 with reduced metals and contaminants appropriate for FCC processing. Other types of separations are contemplated to obtain the hydrocarbon feed stream in line 6 for FCC processing and heavy residual oil in line 8. Additionally, it is contemplated that the hydrocarbon feed stream in line 6 and the heavy residual oil stream in line 8 may come from independent sources. The crude oil stream in line 4 may be natural unprocessed crude or bitumen material, or can contain cracked or otherwise processed stocks or mixtures thereof. Steam may be added to the heavy residual oil from a steam source 71 to atomize the heavy residual oil in line 8 to be delivered to a residual oil thermal cracking process 80 in a line 62.

Deasphalting the crude oil reduces the carbon residue and the metals concentration of the oil, reducing both the coke-making tendency of the oil and deactivation of refining catalysts. In the solvent deasphalting process, heavy hydrocarbon is mixed with a light paraffinic solvent, typically propane, butane, pentane or mixtures thereof. The heavier portions of the oil are insoluble and precipitate as a heavy liquid pitch. The equipment and processing details of solvent deasphalting are described by Abdel-Halim and Floyd in "The ROSE Process", chapter 10.2, R. A. Meyers ed. HANDBOOK OF PETROLEUM REFINING PROCESSES, Third Edition, McGraw-Hill 2003.

The hydrocarbon feed stream from line 6 may enter the riser 15 where it is cracked by cracking catalyst. Cracked products and catalyst exiting the riser 15 are separated in the reactor vessel 12, and a cracked stream of FCC product may exit the top of the reactor vessel 12 through a vapor line 16. Spent catalyst may be withdrawn through a spent catalyst line 17 and enter a bottom portion 21 of the regenerator 20 to be contacted with air pumped via line 23 by a main air blower 45 from an air source 22. Coke is combusted from the spent catalyst thereby providing regenerated catalyst and flue gas. The heat absorbed by the regenerated catalyst supplies the heat necessary to drive the cracking reactions. The resulting regenerated catalyst may be recycled to the riser 15 by a return line 27.

The hot flue gas may exit a top portion 29 of the regenerator 20 through a regenerator outlet 24 and travel through a flue gas line 26 to a spray contactor 30. The hot flue gas leaving the regenerator 20 may have a gauge pressure of about 172 kPa to about 310 kPa (about 25 psig to about 45 psig) and a temperature between about 677° and about 732° C. (between about 1250° and about 1350° F.), and in one embodiment about 704° C. (about 1300° F.). The hot flue gas may include excess oxygen (between about 2 wt-% and about 5 wt-%, typically about 3 wt-%), carbon dioxide, water, and sulfur oxides. In the case of partial combustion regenerators, a smaller concentration of excess oxygen exits in the flue gas and that the carbon dioxide to carbon monoxide molar ratio may be between about 1 and about 5. If the regenerator 20 is operated in complete combustion mode, promoting agents may be impregnated or added to the catalyst to encourage burning of the CO to $CO_2$. The hot flue gas may enter the residual oil thermal cracking process 80, which is a fluid bed thermal cracking and particulation process carried out in the spray contactor 30. In the spray contactor 30, heavy residual oil from the line 62 is thermally cracked to volatile products and leaves behind carbon residue solids.

In normal practice, the oxygen content of the hot flue gas from the regenerator 20 is less than 5 wt-%, which is not enough to support combustion. The operation of the spray contactor 30 will be to thermally crack the residual oil and volatilize the hydrocarbons, both of which are endothermic processes and therefore the heat of the flue gas must be sufficient to maintain the temperature within the spray contactor 30 at a sufficient level. For this reason, it may be in some cases preferable to further heat the flue gas in line 26 using a direct-fired heater 25. Fuel gas or a suitable waste fuel in line 13 from source 28 is mixed with pressurized air from line 23a in a premix burner to supply additional heat for startup or to adjust the gas temperature. The spray contactor 30 produces a hydrocarbon-laden gas stream in line 44 and a solids stream in coke delivery line 42.

As an aid to atomization, steam may be added to the heavy residual oil from a steam source 71. Optionally, the stream 8 may be heated in heater 8a to lower its viscosity for good atomization and to supply a portion of the heat requirement for the cracking and vaporization in the spray contactor 30. In one embodiment, pitch, preferably heavy low-value pitch from the solvent deasphalter 72, may be part of the heavy residual oil sprayed into the spray contactor 30. In a preferred embodiment, the feed in the line 62 is a high-molecular weight pitch material which contains mainly asphaltenes, or the heptane-insoluble portion of the vacuum residue. Other materials may be used as feed in the line 62, as long as they are able to form light products and coke at the conditions of operation.

A portion of the flowing granular solids may be withdrawn from the circulating stream within the spray contactor 30 as coked product in a coke delivery line 42. The exiting coked product particles may be hot and may need to be cooled for safe handling or transportation. Any kind of properly designed fluid bed air cooler or indirect water cooler may be used, or it may be preferable to cool the coked product particles by direct sprayed water injection for example on a vibrating conveyor 43 with the resulting steam condensed and sent to water treatment in line 52. Alternatively, some heat can be recuperated against air going to the supplementary direct fired air heater 25.

The product can be handled as granules in bulk powder systems, or it can be further enlarged to lumps using a briquette forming system 73. The coke delivery line 42 may deliver coked product solids to a hopper 75 by a flowable connection in the briquette forming system 73. The briquette forming system 73 mixes fine coke particles with other materials such as binders or solid waste to form briquettes for convenience of shipping and handing as a solid fuel. Suitable binding materials may be any resinous low-value heavy hydrocarbon stream, such as pitch recovered from solvent deasphalting with a resin settler, or other low-value binding materials. Solid waste may be any compatible material, such as wood or pulp waste, cellulosics, dry or partially dry biomass and the like. The solids circulation-to-coke formation ratio can be regulated so as to deposit a small film of residual oil on the growing particle and therefore avoid lumpy or difficult-to-fluidize material, and produce granules that are more easily handled.

Continuing with FIG. 1, the exiting gas from the spray contactor 30 of the residual oil thermal cracking process 80 in line 44 has a heating value which is equal to its heat of combustion. It also has a sensible heat because of the elevated temperature. Therefore it is most preferably directly combusted to produce steam in an oxidation zone, preferably in an oxidizer 40. The oxidizer 40 may be either of the thermal or catalytic type, both of which are widely known in the chemical process industries for combustion of waste gases or pollution abatement. The cracked and vaporized hydrocarbon products from the thermal conversion of the heavy residual oil feed in the spray contactor 30, along with whatever level of oxygen is remaining in the gas from the spray contactor 30 is heated to the minimum temperature necessary to support efficient combustion. At least the stoichiometric quantity of oxygen must be present to have complete combustion to $CO_2$. For purposes of controlling the temperature and oxygen level in oxidizer 40, burners 40a may be provided. These burners receive fuel gas or waste fuel in lines 23b and 13 from source 28 which is mixed in line 23c with combustion air that may be taken from the discharge of blower 45 and introduced to the burners. The oxidation catalyst may be of the monolithic or honeycomb type and is usually a precious metal deposited upon a ceramic or metallic support. Additionally, some fine carbonaceous particles or tarry material may be efficiently burned if the oxidizer 40 is provided with a section ahead of the combustion catalyst, commonly called a "soot trap" which is a section of non-catalytic porous or monolithic material onto which solid or fine droplets collect and are thermally broken down.

The recovery of energy from the hot gas leaving the regenerator 20 is straightforward because the fine catalyst particles entrained in the regenerator flue gas are intercepted by the liquid feed delivered to the spray contactor 30 from line 62 and are thus encapsulated in the leaving coke. Otherwise, entrained catalyst particles could cause accumulation and erosion in the power recovery expanders 50 and steam generators 60, creating inefficiencies and maintenance problems. The presence of small quantities of solid particles is not a problem to the recipient of the coke product, who undoubtedly expects some ash in the fuel.

As shown in FIG. 1, if it is desired to maximize electrical power generation, the power recovery expander 50 may be connected immediately downstream of the oxidizer 40 and before the steam generator 60. In the latter case, the thermodynamic efficiency of power generation by Brayton cycle is higher due to providing feed at the highest possible inlet temperature to the power recovery expander 50. It is also possible to reheat the gas leaving the power recovery expander 50 in a so-called heat-recovery steam generator (not shown).

The power recovery expander 50 may employ advanced blading materials which can operate at higher temperatures even above about 1093° C. (about 2000° F.) and thereby extract even more power than typical for FCC flue gas temperatures of below 732° C. (1350° F.). The expander 50 may be a turbo-expander. The expanders of this kind may be manufactured by General Electric Co. and incorporated into gas turbines from General Electric Co., such as the MS Gas Turbine Series.

The power recovery expander 50 may recover energy from hot process gas by using the gas to drive compressors, generators, or rotating machinery (all not shown). In the power recovery expander 50, the heat content of the flue gas may be also converted to shaft work that may drive an electricity generator (not shown) and/or an air blower, such as the main air blower 45. The power recovery expander 50 may have an inlet gas temperature limited only by the manufacturer's design rating. In one embodiment, the inlet gas may have a temperature between about 538° and about 815° C. (between about 1000° and about 1500° F.), and in one embodiment about 704° C. (about 1300° F.), and an inlet pressure of between about 200 kPa and about 300 kPa, and in one embodiment about 172 kPa (about 25 psia).

As alternatively shown in FIG. 2, if a maximum yield of superheated steam is desired, a steam generator 60 may be connected immediately downstream of the oxidizer 40 and upstream of the power recovery expander 50. Thermal heat recovery may be maximized at the expense of recovering pressure energy. In either embodiment, the expander 50 is in downstream communication with the oxidizer 40.

The gas leaving the steam generator 60 in FIG. 1 or the power recovery expander 50 in FIG. 2 may then enter a scrubber 74 for flue gas scrubbing. In the scrubber 74, the gas contacts a buffered water/lime wash which adsorbs $SO_2$ to form calcium sulfate for disposal, routinely practiced in existing FCC flue gas wet scrubbing technology.

As shown in FIG. 3, the residual oil thermal cracking process 80 of FIG. 1 may utilize the spray contactor 30 which may comprise a cylindrical vessel with a broader lower section 51 with a spray contactor bottom 31 and a spray contactor riser 39. A frustoconical section transitions the broader lower section 51 to the spray contactor riser 39. The spray contactor 30 may have a gas distributor in communication with an inlet 41 connected at the spray contactor bottom 31 at the end of the line 26 and at least one gas/solid disengaging device flowably connected to the spray contactor riser 39. In operation, the coke particles formed in the spray contactor 34 are entrained by the upflowing gas and enter the solids disengaging device. To avoid the accumulation of larger particles or lumps which are too heavy to be entrained out of the contactor 34, a valve and takeoff line 42b may be provided. This line 42b allows solids to be batchwise or continuously directed to removal from the spray contactor 34. The valve and takeoff line 42b may also be used for removing the solid coke during shutdown or upset conditions. In one embodiment, two cyclones 32 may act as gas/solid disengaging devices and may be connected to the spray contactor riser 39 through cyclone inlets 46. The cyclones are cylindrical in shape and disengage the solids from the gases by forcing the combination of gases and solids to swirl within the cyclone to effect centrifugal separation. The gases will travel upwardly in the gas conduits 47, and the solids will travel downwardly through the cyclone legs 33. The cyclones 32 may each have a second outlet conduit 49 near the bottom of cyclones 32 flowably connected through line 37 to line 42. The cyclones 32 may remove substantially all of the solids-free gas from the spray contactor 30 through the gas conduits 47 and deliver the solids-free gas to the oxidizer 40 (FIG. 1) via the line 44.

The spray contactor 30 may comprise a high-temperature fluidized bed 34 of solids. Atomized streams of heavy residual oil may be sprayed via lines 62 and 63 into the fluidized bed 34.

Spray nozzles 35 may introduce heavy residual feed into the fluidized bed 34 and be selected from the type having a fan-like spray pattern. The spray nozzles 35 may be oriented so that the heavy residual oil feed enters the fluidized bed 34 evenly and contacts the recirculating solids returning from coke return lines 36. The solids accumulate coke-forming material by accretion to the circulating granules, which act as seed coke during startup procedures, thereby forming uniform, fluidizable granules without forming lumps or depositing coke on walls or distributor surfaces. By regulating the solids recycle feed rate by coke return control valves 38 and continuously removing a portion of the coke granules through the second upper outlet conduits 49 at a flow rate governed by coke withdrawal control valves 48, a steady state is maintained which sets the average amount of coke produced per particle and therefore the size of the particle.

Hot flue gas may enter the spray contactor 30 through the inlet 41 at the spray contactor bottom 31. The inlet 41 directs the contents of the flue gas line 26 into the spray contactor 30. The coking temperature in the fluidized bed zone 34 of the spray contactor 30 may be between about 400° C. (about 752° F.) and about 600° C. (1112° F.). However, the pitch need be heated only to a point of flowability before entering the spray contactor 30 from the line 62. In accordance with good spraying practice, atomizing steam may be required to break the relatively viscous residual oil into suitably fine droplets. Water emulsified in the feed from the steam source 71 (FIG. 1) may be employed for this purpose as long as the heat drop due to vaporization of water is not excessive.

Efficient spray injection of pitch through the inlet 41 to the fluidized bed 34 improves heat transfer and insures the hydrocarbons leaving the bed in the spray contactor riser 39 may be free of any heavy uncoked hydrocarbons.

Between about 10 wt-% and about 90 wt-% of the heavy residual oil may be converted into a coke product in the spray contactor 30. Also, within the spray contactor 30, between about 30 wt-% and about 70 wt-% of the heavy residual oil may be converted into vaporized hydrocarbon products and cracked gases.

The velocity in the spray contactor riser 39 is preferably in the transport regime so that there is a continuous circulation of coke particles in the spray contactor 30 from the fluidized bed 34 to the spray contactor riser 39 and downwardly through the cyclone leg 33 of each cyclone 32. However, a fast fluidized flow regime is also contemplated. A portion of coke particles may be returned to the fluidized bed 34 through the coke return lines 36 and another portion of coke particles may be withdrawn through the second outlet conduits 49 and directed to bulk storage or the briquette forming system 73 through the coke delivery line 42. One second outlet conduit 49 may be located at the bottom of each cyclone leg 33. The amount of coke particles to be returned through coke return lines 36 may be regulated by the coke return control valves 38 and the amount of coke particles to be directed to storage or briquetting may be regulated by the coke delivery control valves 48.

Solids-free gas may travel up the cyclones 32 and through the gas conduits 47. The solids-free gas may be directed to the oxidizer 40 (FIG. 1) via the line 44 where the gas may be burned.

The coking scheme 10 can be operated at an overall pressure drop equal to that of the fluidized bed 34, the spray contactor riser 39 and the cyclones 32 of the spray contactor 30. In a preferred embodiment, this pressure drop is minimized to be less than that of the typical multiple swirl-tube separators, often referred to as third stage separators, used in FCC units with power recovery turboexpanders. In this way, the coking scheme 10 does not rob power in the form of pressure energy from the flue gas.

In an alternative embodiment (not shown), a coking scheme may include a spray quench drum and dry screw compressor instead of the oxidizer 40. The hot hydrocarbon containing gas from the spray contactor in line 44 may be ducted to one or more direct-contact spray quench drums with heat removal in a liquid pumparound. Heat removal may most preferably be by steam generation and accumulated recovered liquid products are sent off to be further refined or hydrotreated. The vapor from the quench drum may be subjected to scrubbing. The discharge stream of this scrubbing may be steam-stripped to avoid hydrocarbon entrainment. After cooling to a suitable inlet temperature of about 93° C. (about 200° F.) and if sufficient fuel value remains in the discharge gas stream, it may be sent to one or more stages of compression in suitable machinery which is well understood in the refining process industry to include a header pressure which burns fuel gas. For example, air and/or supplementary fuel may be added to the discharge stream in a gas turbine for power generation and the effluent may be used to generate steam before it is sent to the atmosphere.

In this invention, the heat of the flue gas leaving the FCC process directly, or supplemented by additional fired heating, may be sufficient to accomplish the thermal decomposition, therefore eliminating an expensive and troublesome part of the prior art process. Another benefit is the recovery of useful process energy from the FCC flue gas. Still another benefit is the mixing of the cracked decomposition product hydrocarbons with the FCC flue gas to augment its heating value for the purposes of steam generation. Still another benefit is that if this augmented heating value gas under pressure is combusted, the energy can be extracted as useful electric power in a turboexpander.

In refining operations which employ solvent deasphalting, it is sometimes desired to convert the heavy and difficult-to-transport pitch to solid coke. This can be done by blending the pitch with other streams and sending to a delayed coker. However, the quantities of pitch that can be handled in this way are sometimes limited by the fact that the mixture must be heated to coking temperature in a fired heater. It is well known in industrial coking practice that the tubes of the fired heater will foul if either of the temperature or coking tendency, due to high Conradson carbon residue, of the mixture is too high or the combination of these parameters is beyond a safe limit. In the process of this invention, this limitation is overcome, because the pitch can be directly coked without the necessity to blend it with other stocks to reduce the coking tendency.

While the foregoing written description of the invention enables one of ordinary skill to make and use what is considered presently to be the best mode thereof, those of ordinary skill will understand and appreciate the existence of variations, combinations, and equivalents of the specific exemplary embodiments thereof. The invention is therefore to be limited not by the exemplary embodiments herein, but by all embodiments within the scope and spirit of the appended claims.

What is claimed is:

1. A coking process, comprising:
   cracking a hydrocarbon feed stream with a catalyst to form a cracked hydrocarbon products stream and a spent catalyst;
   regenerating the spent catalyst so that a regenerated catalyst and a hot flue gas are obtained, wherein the hot flue gas comprises excess oxygen in a range from about 2 wt-% to about 5 wt-%;
   directing the hot flue gas into a spray contactor, while concurrently spraying a heavy residual oil into the spray contactor so that,
   a) the heavy residual oil and the hot flue gas are mixed, and
   b) the heavy residual oil is converted to obtain at least volatile products and a free-flowing solids stream comprising coke particles.

2. The process of claim 1 wherein the volatile products form a stream of hydrocarbon-laden gas, the process further comprising combusting aid the hydrocarbon-laden gas with oxygen in an oxidation zone.

3. The process of claim 2 wherein the combusting step further comprises adding oxygen to the oxidation zone.

4. The process of claim 2 wherein the combusting step further comprises utilizing an oxidation catalyst.

5. The process of claim 1 wherein between about 10 wt-% and about 90 wt-% of the heavy residual oil is converted into the free-flowing solids stream comprising coke particles.

6. The process of claim 5 wherein between about 30 wt-% and about 70 wt-% of the heavy residual oil is converted into liquid products and cracked gases.

7. The process of claim 1 wherein the heavy residual oil is converted at a temperature in a range from about 400° C. to about 600° C.

8. The process of claim 1 wherein the hot flue gas further comprises carbon dioxide, water and sulfur oxides.

9. The process of claim 1 wherein the hot flue gas is obtained from regenerating the spent catalyst in a partial combustion mode and a mole ratio of $CO_2$ to CO in a range between about 1 and about 5 is obtained.

10. The process of claim 1 wherein the hot flue gas is obtained from regenerating the spent catalyst in a complete combustion mode with promoters and, compared to a partial combustion mode, an increased percentage of nitrogen and $CO_2$ is obtained.

11. The process of claim 1 further comprising heating the flue gas with combustion gases before delivering the flue gas into the spray contactor.

12. A fluid catalytic cracking (FCC) process, comprising:
    deasphalting a crude oil stream to form a hydrocarbon feed stream and a heavy residual oil;
    cracking the hydrocarbon feed stream with a catalyst in a reactor having a riser section to form a cracked hydrocarbon products stream and a spent catalyst;
    regenerating the spent catalyst so that a regenerated catalyst and a hot flue gas are obtained, wherein the hot flue gas comprises excess oxygen in a range from about 2 wt-% to about 5 wt-%;
    recycling the regenerated catalyst to the riser section;
    directing the hot flue gas into a spray contactor, while concurrently spraying the heavy residual oil into the spray contactor so that,
    a) the heavy residual oil and the hot flue gas are mixed, and
    b) the heavy residual oil is converted to obtain at least volatile products forming a stream of hydrocarbon-laden gas and a free-flowing solids stream comprising coke particles;
    directing the stream of hydrocarbon-laden gas to an oxidation zone; and
    combusting the hydrocarbon-laden gas in the oxidation zone.

* * * * *

UNITED STATES PATENT AND TRADEMARK OFFICE
CERTIFICATE OF CORRECTION

PATENT NO. : 7,622,033 B1  Page 1 of 1
APPLICATION NO. : 11/456907
DATED : November 24, 2009
INVENTOR(S) : James F. McGehee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Twenty-sixth Day of October, 2010

David J. Kappos
*Director of the United States Patent and Trademark Office*